(12) United States Patent
Di Gennaro et al.

(10) Patent No.: US 6,601,571 B1
(45) Date of Patent: Aug. 5, 2003

(54) SYSTEM FOR VAPORIZING LIQUEFIED PETROL GAS HEATED BY ENGINE LUBRICATING OIL

(76) Inventors: Antoine Di Gennaro, 17 avenue Général Pruniau, 83000 Toulon (FR); Michel Porta, 20 avenue de la Caravelle, l'Aiguade, 83400 Hyeres (FR)

( * ) Notice: Subject to any disclaimer, the term of this patent is extended or adjusted under 35 U.S.C. 154(b) by 0 days.

(21) Appl. No.: 09/424,836
(22) PCT Filed: Oct. 6, 1997
(86) PCT No.: PCT/FR97/01773

§ 371 (c)(1),
(2), (4) Date: Dec. 3, 1999

(87) PCT Pub. No.: WO98/55758

PCT Pub. Date: Dec. 10, 1998

(Under 37 CFR 1.47)

(30) Foreign Application Priority Data

Jun. 3, 1997 (FR) .............................. 97 07071

(51) Int. Cl.⁷ .............................................. F02M 21/06
(52) U.S. Cl. ...................................... 123/557; 123/549
(58) Field of Search ............................... 123/543–557, 123/196 R, 196 AB, 27 GE

(56) References Cited

U.S. PATENT DOCUMENTS

| | | | | |
|---|---|---|---|---|
| 4,112,899 A | * | 9/1978 | Kramer ................ 123/139 AW |
| 4,742,801 A | * | 5/1988 | Kelgard ................ 123/27 GE |
| 5,086,748 A | * | 2/1992 | Yokoayama ................ 123/549 |
| 6,044,825 A | * | 4/2000 | Carter et al. ................ 123/557 |

FOREIGN PATENT DOCUMENTS

| | | |
|---|---|---|
| DE | 3044744 | 3/1982 |
| DE | 3840622 | 6/1990 |
| DE | 4244328 | 6/1994 |
| JP | 5018322 | 1/1993 |

OTHER PUBLICATIONS

An English Language abstract of JP 5–018322.
An English Language abstract of DE 30 44 744.
An English Language abstract of DE 42 44 328.
An English Language abstract of DE 38 40 622.

* cited by examiner

*Primary Examiner*—Marguerite McMahon
(74) *Attorney, Agent, or Firm*—Greenblum & Bernstein, P.L.C.

(57) ABSTRACT

A system for vaporizing and supplying liquefied petrol gas to an internal combustion engine, the internal combustion engine comprising an oil circuit for lubricating the engine and utilizing one of a carburetor and fuel injection. The system includes a vaporizing housing having a temperature chamber and of a vaporizing chamber. The temperature chamber is connected to the oil circuit for lubricating the engine. The vaporizing chamber is connected to a liquefied gas tank and to one of the carburetor and the fuel injection, the liquefied petrol gas being heated by the engine oil.

27 Claims, 1 Drawing Sheet

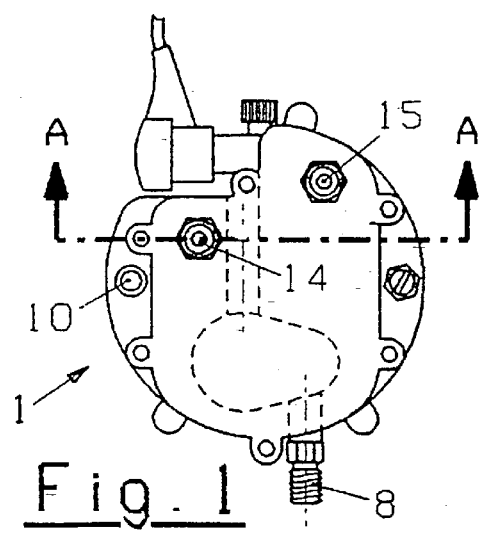
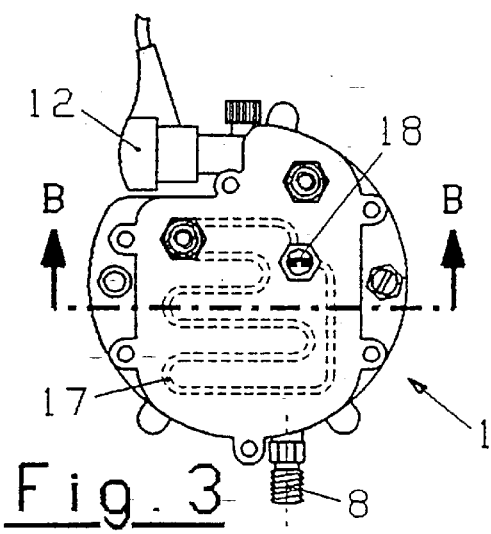
Fig. 1   Fig. 3
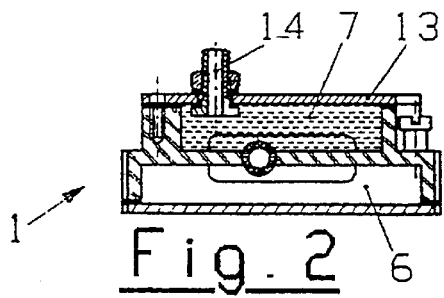
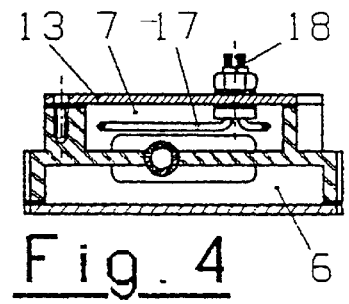
Fig. 2   Fig. 4
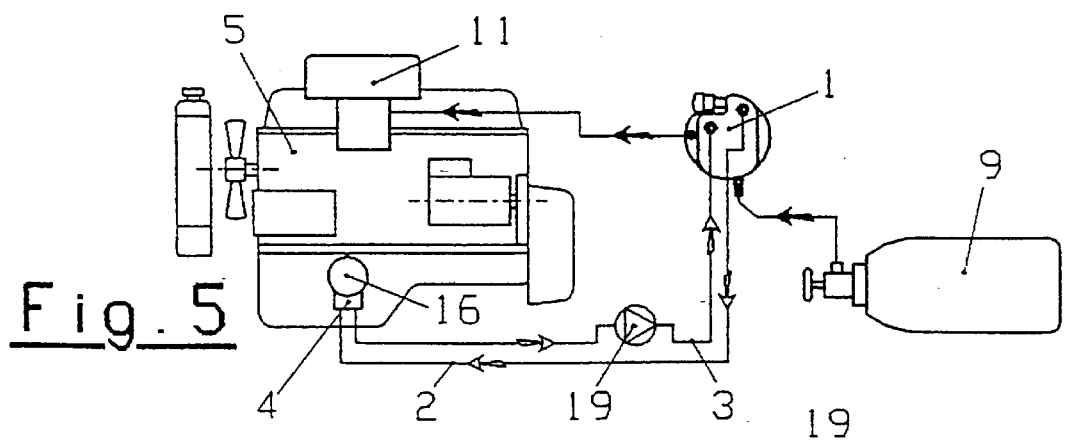
Fig. 5
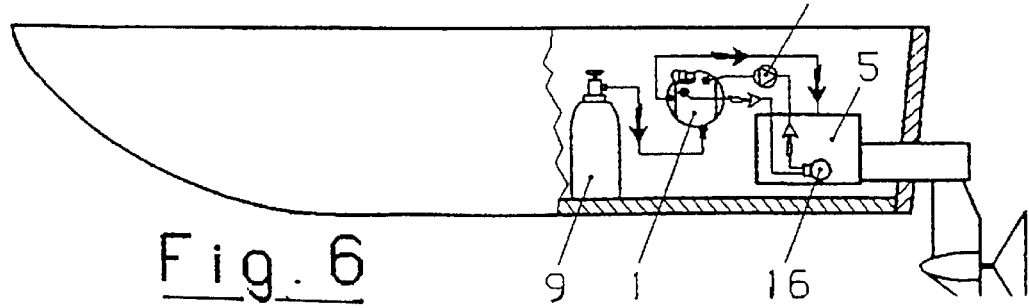
Fig. 6

SYSTEM FOR VAPORIZING LIQUEFIED PETROL GAS HEATED BY ENGINE LUBRICATING OIL

The present invention relates to a system for vaporizing liquefied petrol gas heated by engine lubricating oil.

It aims at supplying liquefied petrol gas (L.P.G.) to internal combustion engines normally a receiving liquid fuel.

It is suitable to all types of internal combustion engines, of the carburetor or injection types, whether they are stationary engines, land vehicle engines, or boat engines.

Liquefied petrol gas is increasingly used as a source of energy for motor vehicles. Indeed, this fuel has very interesting advantages, the most important of which are low pollution, and an advantageous taxation practiced by numerous countries and allowing a substantial cost reduction per kilometer.

Using liquefied gas to operate an engine initially designed to receive a liquid fuel requires the use of a special device ensuring the vaporizing of the gas under pressure, and a predetermined throughput.

This device has the shape of a housing, generally made of light cast metal, such as aluminum and comprising a double enclosure formed of a chamber for vaporizing the gas, and of a temperature chamber in which a hot liquid circulates, which is generally constituted by the engine cooling water collected due to a branch provided on the circuit connecting the latter to the radiator. The two chambers have a common wall arranged so as to allow a good transmission of calories.

For certain types of engines, such as air-cooled engines or sea water-cooled marine engines, it is difficult, even impossible, to use the coolant to ensure the provision of calories necessary for the vaporizing of the liquefied gas.

In addition, it takes a fairly long time for the cooling water to reach the necessary temperature for vaporizing the liquefied gas, particularly in cold weather, which requires the use of gasoline during the starting period; such period can last several minutes. Moreover, the energy supply decreases substantially when the engine is idle, frequently forcing the user to switch to the gasoline supply when he is driving in town or is caught in traffic jams.

The Patent Application No. FR 97 01 705, filed by the same inventors, describes a housing for vaporizing the liquefied gas comprising, within the temperature chamber, a heating element constituted of an electric resistance controlled by a thermostat and connected to the engine electric circuit or to an external source, the temperature chamber preferably being filled with a good heat conducting liquid or pasty product that is capable of transmitting the calories of the hot liquid to the vaporizing chamber.

The tests conducted with this device have shown that it is very difficult, using this means, to produce a sufficient amount of energy with a conventional vaporizing housing and that to function properly, it is necessary to use an oversized apparatus and a more powerful source of current than that which is usually found on common vehicles.

The device according to the present invention eliminates all these drawbacks. Indeed, it makes it possible to very quickly put the liquefied gas supply into operation when starting, with a conventional housing; it can operate correctly even when the engine is running at very low speed, and can be used with all types of oil circulation lubricated internal combustion engines, regardless of its cooling system. Furthermore, it plays the role of an oil radiator, and can allow suppressing this device in certain cases.

It is constituted of a housing for vaporizing the liquefied gas, whose temperature chamber is branch-connected, by a double conduit, to the engine lubricating circuit, by means of a connecting block mounted at the oil filter base and normally used by certain engines for radiators cooling the lubricating fluid.

In the annexed drawings, which are provided by way of non-limiting examples of embodiments of the object of the invention:

FIG. 1 shows a closed device for vaporizing liquefied gas, seen on the side of the temperature chamber;

FIG. 2 is a transverse cross-section along the arrows A—A of FIG. 1;

FIG. 3 shows, in the same conditions as in FIG. 1, a vaporizing device equipped with an electric resistance for supplemental heating;

FIG. 4 is a transverse cross-section along the arrows B—B of FIG. 3;

FIG. 5 schematically shows the mounting of the device on an engine; and

FIG. 6 is a diagram showing an example of installation of the system on a boat.

The assembly in FIGS. 1–6 is constituted of a housing 1 for vaporizing liquefied petrol gas 1 connected by a flexible double conduit 2, 3 to a branch element 4 which makes it possible to pass the circulation of the lubricating oil outside the engine 5.

The housing 1 comprises a vaporizing chamber 6 and a temperature chamber 7 that are contiguous and separated by a common wall. The vaporizing chamber comprises the evaporation cavity itself, as well as the assembly of mechanisms for controlling the pressure and gas flow.

The evaporation cavity is connected by internal conduits to the gas inlet 8 connected to the liquefied gas tank 9, on the one hand, and to the gas outlet 10 connected to the carburetor 11 of the engine 5, on the other hand. The gas circuit is controlled by an electrovalve 12.

The temperature chamber 7 is provided with a cover 13 on which are mounted the oil inlet and outlet couplings 14, 15, to which are connected, on the outside, flexible conduits 2, 3, connected to the branch element (4). This connector, used by certain engines for radiators cooling the lubricating fluid, is constituted of a cast block mounted at the base of the oil filter 16 and comprising two couplings communicating with the engine crankcase and said oil filter, respectively.

In order to be able to provide a supplement of heat energy when necessary, the temperature chamber 7 can alternatively be equipped advantageously with an internal electric resistance 17 connected to a source of current, which can be the battery of the vehicle, by means of a connector 18 mounted on the cover 13.

Preferably, this resistance device 17 is of the shielded type and is fixed to the internal surface of the cover in order to facilitate its mounting and dismounting. However, it can be of any type and can be mounted in the temperature chamber according to any adequate technique. Similarly, the connector 18 can be arranged directly on any portion of the housing 1, or can be replaced by any other electric supply system.

Activating and deactivating the resistance is carried out by a thermostat that is branch-connected to the electric supply controlling the temperature of the temperature chamber. This thermostat can be located inside as well as outside the housing 1.

In order to increase the efficiency of the system, the circuit constituted by the double conduit 2, 3 ensuring the circulation of the engine lubricating oil toward the temperature chamber 7 can advantageously comprise a pump 19, of the electric, mechanical, gear type, or the like, adapted to accelerate the oil flow. This pump can be and possibly be directly driven by it, by means of a belt, for example.

The positioning of the various constituent elements provides the object of the invention with a maximum of useful effects which had not, to date, been obtained by similar devices.

What is claimed:

1. A system for vaporizing and supplying liquefied petrol gas to an internal combustion engine, the internal combustion engine comprising an engine oil circuit for lubricating the engine and having one of a carburetor and fuel injection, the system comprising:
    a vaporizing housing having a temperature chamber and a vaporizing chamber;
    the temperature chamber being connected to the engine oil circuit; and
    the vaporizing chamber being connected to a liquefied gas tank and to one of the carburetor and the fuel injection,
    wherein the liquefied petrol gas is heated by the engine oil,
    wherein the temperature chamber and the vaporizing chamber are separated from one another by a wall, and
    wherein the vaporizing chamber is connected to the liquefied gas tank via a gas inlet directly coupled to the vaporizing chamber.

2. The system of claim 1, wherein the internal combustion engine comprises an engine which normally receives a liquid fuel.

3. The system of claim 1, wherein the system is adapted for use on all types of internal combustion engines.

4. The system of claim 1, wherein the vaporizing chamber is connected to the liquefied gas tank via a branch-connection and a flexible double conduit.

5. The system of claim 1, wherein the liquefied petrol gas is vaporized in the vaporizing chamber as a result of being heated by the engine oil circulating through the temperature chamber.

6. The system of claim 4, further comprising a branch element connected to the oil circuit and the branch-connection.

7. The system of claim 6, wherein the branch element allows lubricating engine lubrication oil to circulation outside of the engine.

8. The system of claim 6, wherein the branch element comprises a casting block which is adapted to be mounted on an oil filter base.

9. The system of claim 8, wherein the branch element comprises two couplings, one coupling allowing oil to circulate from the engine to the temperature chamber and another coupling allowing oil to circulate from the temperature chamber to the engine.

10. The system of claim 1, wherein the temperature chamber is connected to the oil circuit via an oil delivery circuit comprising first and second conduits.

11. The system of claim 10, wherein the oil delivery circuit further comprises a pump adapted to accelerate oil flow.

12. The system of claim 11, wherein the pump is adapted to circulate the oil from the engine to the temperature chamber.

13. The system of claim 11, wherein the pump is separated from the engine.

14. The system of claim 13, wherein the pump is directly driven by the engine via a belt.

15. The system of claim 1, further comprising an internal electric resistance capable of providing a supplement of heat energy to the temperature chamber.

16. The system of claim 15, wherein the internal electrical resistance element is disposed within the temperature chamber.

17. The system of claim 15, wherein the vaporizing housing comprises a cover.

18. The system of claim 17, wherein the cover is disposed adjacent the temperature chamber and wherein the internal electric resistance is fixed to an internal surface of the cover.

19. The system of claim 18, wherein the internal resistance is connected to a source of current by a connector mounted on the cover.

20. The system of claim 19, wherein the source of current is a battery of a vehicle.

21. The system of claim 19, further comprising a thermostat for activating and deactivating the internal electric resistance.

22. The system of claim 21, wherein the thermostat is connected to the internal electrical resistance, the thermostat controlling a temperature of the temperature chamber.

23. The system of claim 1, wherein the wall comprises a common wall separating the temperature chamber from the vaporizing chamber.

24. The system of claim 1, wherein the vaporizing chamber is connected to one of the carburetor and the fuel injection via a gas outlet.

25. The system of claim 24, wherein the vaporizing chamber is connected to each of the liquefied gas tank and to one of the carburetor and the fuel injection via a gas circuit comprising flexible conduits.

26. The system of claim 25, further comprising an electro-valve for controlling the gas circuit.

27. A system for vaporizing and supplying liquefied petrol gas to an internal combustion engine, the internal combustion engine comprising an engine oil circuit for lubricating the engine and having one of a carburetor and fuel injection, the system comprising:
    a vaporizing housing having a temperature chamber and a vaporizing chamber;
    the temperature chamber being connected to the engine oil circuit;
    the vaporizing chamber being connected to a liquefied gas tank and to one of the carburetor and the fuel injection,
    the liquefied petrol gas being heated by the engine oil;
    the temperature chamber and the vaporizing chamber are separated from one another by a common wall;
    the vaporizing chamber being connected to the liquefied gas tank via a gas inlet that is directly coupled to the vaporizing chamber; and
    an internal electric resistance capable of providing a supplement of heat energy to the temperature chamber.

* * * * *